US009830017B2

(12) United States Patent
Yao

(10) Patent No.: US 9,830,017 B2
(45) Date of Patent: Nov. 28, 2017

(54) INFRARED TOUCH SCREEN, TOUCH DETECTION METHOD THEREOF AND DISPLAY APPARATUS

(71) Applicants: BOE Technology Group Co., Ltd., Beijing (CN); Beijing BOE Display Technology Co., Ltd., Beijing (CN)

(72) Inventor: Shulin Yao, Beijing (CN)

(73) Assignees: BOE Technology Group Co., Ltd., Beijing (CN); Beijing BOE Display Technology Co., Ltd., Beijing (CN)

(*) Notice: Subject to any disclaimer, the term of this patent is extended or adjusted under 35 U.S.C. 154(b) by 0 days.

(21) Appl. No.: 14/892,433

(22) PCT Filed: Jun. 19, 2015

(86) PCT No.: PCT/CN2015/081914
§ 371 (c)(1),
(2) Date: Nov. 19, 2015

(87) PCT Pub. No.: WO2016/086647
PCT Pub. Date: Jun. 9, 2016

(65) Prior Publication Data
US 2016/0357335 A1 Dec. 8, 2016

(30) Foreign Application Priority Data
Dec. 4, 2014 (CN) .......................... 2014 1 0736587

(51) Int. Cl.
G06F 3/041 (2006.01)
G06F 3/042 (2006.01)

(52) U.S. Cl.
CPC ............ *G06F 3/0418* (2013.01); *G06F 3/042* (2013.01); *G06F 3/0412* (2013.01); *G06F 3/0421* (2013.01)

(58) Field of Classification Search
None
See application file for complete search history.

(56) References Cited

U.S. PATENT DOCUMENTS

| 2010/0214268 A1* | 8/2010 | Huang | .................. G06F 3/0421 345/175 |
| 2013/0141395 A1* | 6/2013 | Holmgren | ............. G06F 3/0421 345/175 |
| 2016/0034109 A1* | 2/2016 | Cho | .......................... G06F 1/16 345/175 |

FOREIGN PATENT DOCUMENTS

| CN | 101916152 A | 12/2010 |
| CN | 102073417 A | 5/2011 |

(Continued)

OTHER PUBLICATIONS

Sep. 14, 2015—International Search Report and Written Opinion Appn PCT/CN2015/081914 with English Tran.

(Continued)

*Primary Examiner* — Joseph Haley
*Assistant Examiner* — Emily Frank
(74) *Attorney, Agent, or Firm* — Banner & Witcoff, Ltd.

(57) ABSTRACT

An infrared touch screen, a touch detection method thereof and a display apparatus are provided. The infrared touch screen comprises: a display device, an infrared emitter and a first infrared receiver arranged at any side of a display surface of the display device, the infrared emitter emitting a plurality of infrared rays scattered and covering a light exiting surface of the display device; and a plurality of second infrared receivers arranged at intervals on other sides the display surface of the display device except the side provided with the infrared emitter and corresponding to the plurality of infrared rays in a one-to-one correspondence relationship, wherein, the first infrared receiver detects an (Continued)

infrared ray reflected by a touch position, in the infrared rays emitted by the infrared emitter.

11 Claims, 2 Drawing Sheets

(56) References Cited

FOREIGN PATENT DOCUMENTS

| | | |
|---|---|---|
| CN | 102236476 A | 11/2011 |
| CN | 203012671 U | 6/2013 |
| CN | 103970358 A | 8/2014 |
| CN | 104102393 A | 10/2014 |
| CN | 104407747 A | 3/2015 |

OTHER PUBLICATIONS

Nov. 18, 2016—(CN) First Office Action Appn 201410736587.2 with English Tran.
Apr. 12, 2017—(CN) Second Office Action Appn 201410736587.2 with English Tran.

\* cited by examiner

INFRARED TOUCH SCREEN, TOUCH DETECTION METHOD THEREOF AND DISPLAY APPARATUS

The application is a U.S. National Phase Entry of International Application No. PCT/CN2015/081914 filed on Jun. 19, 2015, designating the United States of America and claiming priority to Chinese Patent Application No. 201410736587.2 filed on Dec. 4, 2014. The present application claims priority to and the benefit of the above-identified applications and the above-identified applications are incorporated by reference herein in their entirety.

TECHNICAL FIELD

Embodiments of the present disclosure relate to an infrared touch screen, a touch detection method thereof and a display apparatus.

BACKGROUND

At present, an infrared touch screen has been widely applied due to its advantage that it is not interfered by current, voltage and static electricity, and thus is applicable in severe environment.

In an existing infrared touch screen, a touch of a user is detected and positioned through infrared ray matrixes densely distributed in X and Y directions; the infrared touch screen comprises a display device, and infrared emitters arranged on any two adjacent sides of the display device and infrared receivers arranged on other two adjacent sides except the sides provided with the infrared emitters form the horizontal and vertical infrared matrixes. When the user touches the display device, a finger will block two horizontal and vertical infrared rays at this touch position, so that the position of a touch point on the display device can be judged.

For the existing infrared touch screen, in order to achieve higher resolution, it is necessary to increase the number of the infrared emitters and infrared receivers at the same time, in this way, a whole size of the infrared touch screen is increased; and therefore, the size of the existing infrared touch screen is restricted by the number of the infrared emitters and infrared receivers, thereby limiting the resolution of the infrared touch screen, increasing manufacturing cost, and limiting application thereof in a large-sized display device.

SUMMARY

Embodiments of the disclosure provide an infrared touch screen, a touch detection method thereof, and a display apparatus, in which the number of infrared emitters can be reduced, resolution can be improved to implement a precise touch operation, and manufacturing cost can be effectively reduced.

In one aspect, an embodiment of the disclosure provides an infrared touch screen, comprising: a display device; an infrared emitter and a first infrared receiver, arranged on any side of a display surface of the display device, the infrared emitter emitting a plurality of infrared rays scattered and covering a light exiting surface of the display device; and a plurality of second infrared receivers, arranged at intervals on other sides of the display surface of the display device except the side provided with the infrared emitter and corresponding to the plurality of infrared rays in a one-to-one correspondence relationship, wherein, the first infrared receiver detects an infrared ray reflected by a touch position among the infrared rays emitted by the infrared emitter.

In another aspect, an embodiment of the disclosure further provides a display device, comprising the above infrared touch screen provided by the embodiment of the disclosure.

In still another aspect, an embodiment of the disclosure further provides a touch detection method for the above infrared touch screen provided by the embodiment of the disclosure, comprising: controlling the infrared emitter to emit a plurality of infrared rays scattered and covering the light exiting surface of the display device; receiving an infrared signal detected by the first infrared receiver and the plurality of second infrared receivers; and determining coordinates of a touch position according to the infrared signal detected by the first infrared receiver and the plurality of second infrared receivers.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
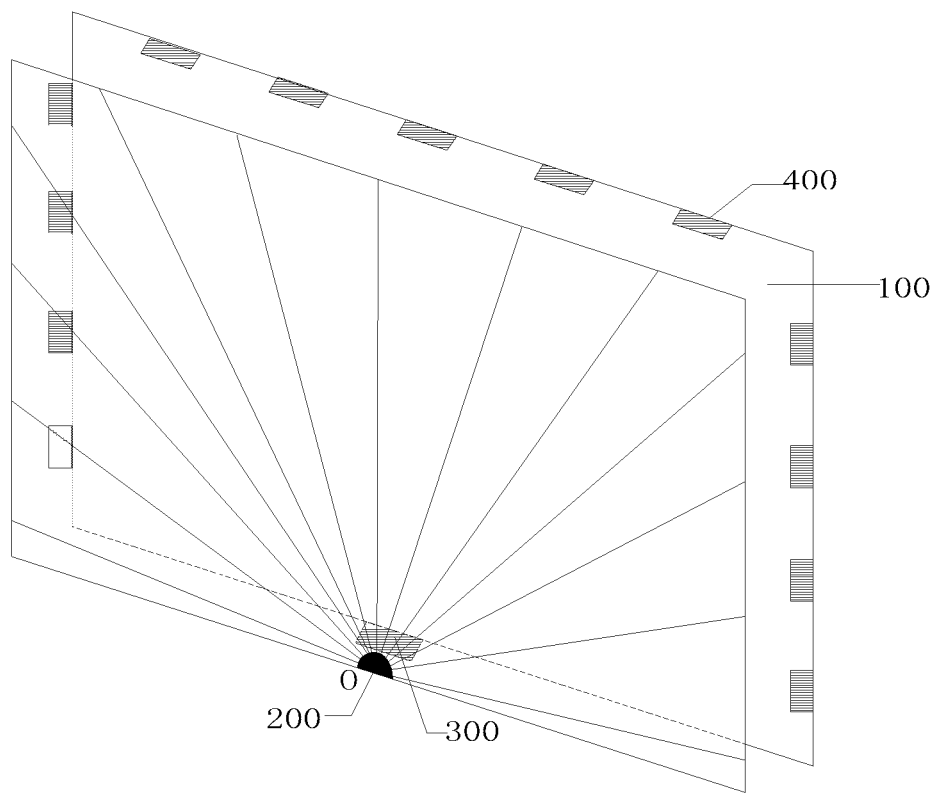
FIG. 1 is a side view of an infrared touch screen provided by an embodiment of the disclosure.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Hereinafter, exemplary implementation modes of an infrared touch screen, a touch detection method thereof and a display device provided by embodiments of the disclosure are described in combination with the drawings.

Wherein, sizes and shapes of respective members in the drawings do not reflect a real ratio of the infrared touch screen, and are merely intended to describe content of the embodiments of the disclosure.

Figure 2:
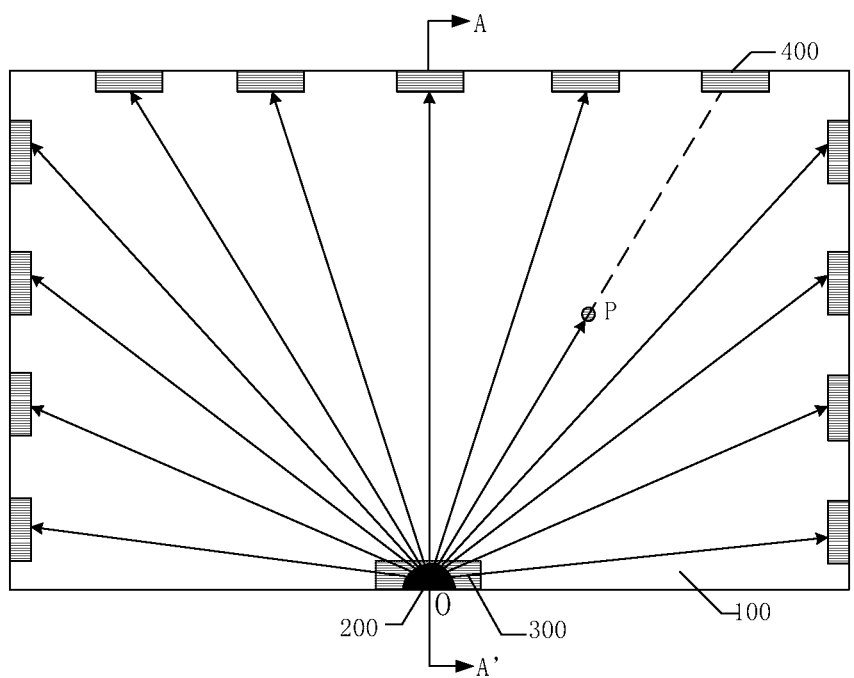
FIG. 2 is a front view of an infrared touch screen provided by an embodiment of the disclosure.

An embodiment of the disclosure provides an infrared touch screen, as shown in FIG. 1 and FIG. 2, comprising: a display device 100, and a pair of an infrared emitter 200 and a first infrared receiver 300 arranged on any one side of a light exiting surface of the display device 100; wherein, the infrared emitter 200 emits a plurality of infrared rays scattered and covering the light exiting surface of the display device 100, and the first infrared receiver 300 detects an infrared ray reflected by a touch position, in the infrared rays emitted by the infrared emitter 200; as shown in FIG. 1 and FIG. 2, the infrared emitter 200 emits infrared rays towards the other three sides except the side of the light exiting surface of the display device provided with the infrared emitter 200.

The infrared touch screen further comprises: a plurality of second infrared receivers 400 arranged at intervals on other sides of the display device 100 except the side provided with the infrared emitter 200 and corresponding to the infrared rays in a one-to-one corresponding relationship; as shown in FIG. 2, a position of each of the plurality of second infrared receivers 400 on the side is same as a position where one of the plurality of infrared rays emitted by the infrared emitter 200 irradiates on a corresponding side.

In the infrared touch screen provided by the embodiment of the disclosure, any side of the display surface of the display device 100 only adopts one infrared emitter 200 capable of emitting a plurality of infrared rays scattered and covering the light exiting surface of the display device 100, and one first infrared receiver 300 capable of detecting an infrared ray reflected by a touch position, in the infrared rays emitted by the infrared emitter 200; in this way, not only resolution of the infrared touch screen can be improved to implement a precise touch operation, but also manufacturing cost is effectively reduced, and applicability to a large-sized display device is realized.

Figure 3:
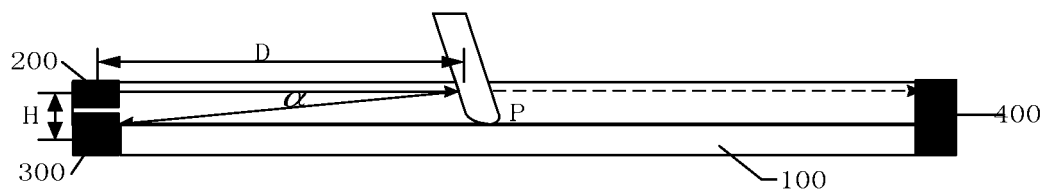
FIG. 3 is a sectional schematic structural view of FIG. 2 along an A-A' direction.

Exemplarily, in the infrared touch screen provided by the embodiment of the disclosure, in order to enable the first infrared receiver 300 to detect an infrared ray reflected by a touch position among the infrared rays emitted by the infrared emitter 200, as shown in FIG. 3, in a light exiting direction of the display device, the infrared emitter 200 is positioned above the first infrared receiver 300, in addition, there is a preset interval H between the infrared emitter 200 and the first infrared receiver 300, in this way, not only it is ensured that the first infrared receiver 300 may detect the infrared ray reflected by the touch position among the infrared rays emitted by the infrared emitter 200, but also a distance D from the touch position P to the first infrared receiver 300 may be further computed according to the preset interval H between the infrared emitter 200 and the first infrared receiver 300 and an infrared signal detected by the first infrared receiver 300.

Exemplarily, in the infrared touch screen provided by the embodiment of the disclosure, in order to make it easier for the infrared emitter 200 to emit a plurality of infrared rays covering a whole light exiting surface of the display device 100, as shown in FIG. 1 and FIG. 2, the infrared emitter 200 and the first infrared receiver 300 are positioned at a central position O of any side of the display device 100 at the same time.

For example, in the infrared touch screen provided by the embodiment of the disclosure, according to an operation habit of a user on the infrared touch screen, the infrared ray reflected by a position touched by the user, in the infrared rays emitted by the infrared emitter 200 has higher probability to be emitted to a bottom side of the display device 100; in order to make it easier for the first infrared receiver 300 to detect the infrared ray reflected by the touch position, in the infrared rays emitted by the infrared emitter 200, as shown in FIG. 1 and FIG. 2, the infrared emitter 200 and the infrared receiver 300 may be arranged on the bottom side of the display device 100.

Exemplarily, in the infrared touch screen provided by the embodiment of the disclosure, in order to enable each of the plurality of second infrared receivers 400 to better detect the infrared rays emitted by the infrared emitter 200, and to accurately judge an infrared ray path in which a touch occurs according to a position of a second infrared receiver 400 which does not detect out the infrared signal, as shown in FIG. 2, the plurality of infrared rays emitted by the infrared emitter 200 are uniformly distributed on the light exiting surface of the display device 100; in addition, the second infrared receivers 400 are also uniformly distributed on other sides of the display device except the side provided with the infrared emitter 200.

Exemplarily, the infrared touch screen provided by the embodiment of the disclosure may further comprise: a signal processing chip for determining coordinates of the touch position on the light exiting surface of the display device 100, and the signal processing chip is connected with the first infrared receiver 300 and the plurality of second infrared receivers 400, respectively.

Exemplarily, in the infrared touch screen provided by the embodiment of the disclosure, in order to determine the coordinates of the touch position on the light exiting surface of the display device 100, the signal processing chip may include four units as follows:

A signal receiving unit for receiving an infrared signal detected by the first infrared receiver 300 and the second infrared receivers 400;

Exemplarily, as shown in FIG. 1, when no touch occurs, that is to say, when no finger of the user or other article approaches the display device 100, the second infrared receivers 400 will detect all infrared rays, emitted by the infrared emitter 200, scattered and covering an light exiting surface of the display device 100 and corresponding to the second infrared receivers 400 in a one-to-one correspondence relationship; at the moment, the signal receiving unit may receive the infrared signals detected by each of the second infrared receivers 400; as shown in FIG. 2, when a touch occurs, that is to say, when a finger of the user or other article approaches the display device 100, the infrared ray emitted by the infrared emitter 200 is blocked at the touch position, and therefore, there will be a second infrared receiver which does not detect out the infrared signal among the second infrared receivers 400, the blocked infrared ray is reflected, the first infrared receiver 300 detects the infrared ray reflected by the touch position, for example, a touch article; at the moment, the infrared receiving unit may receive the infrared signal detected by the first infrared receiver 300 but cannot receive an infrared signal at a position of the second infrared receiver, which does not detect out an infrared signal, among the second infrared receivers 400;

A first determining unit for determining an infrared ray path in which a touch occurs according to the position of the second infrared receiver, which does not detect out the infrared signal, among the second infrared receivers 400;

Exemplarily, since the signal receiving unit cannot receive an infrared signal at the position of the second infrared receiver, which does not detect out the infrared signal, among the second infrared receivers 400, the first determining unit may determine the infrared ray path in which the touch occurs according to the position of the second infrared receiver;

A second determining unit for computing the distance D from the touch position P to the first infrared receiver 300 according to an included angle between the infrared signal received by the first infrared receiver 300 and the display surface of the display device 100 as well as the distance H between the first infrared receiver 300 and the infrared emitter 200;

Exemplarily, as shown in FIG. 3, the second determining unit may detect the included angle between the infrared signal received by the first infrared receiver 300 and the display surface of the display device 100, while the distance H between the first infrared receiver 300 and the infrared emitter 200 is set according to actual situation, that is to say, H is a constant value, and the distance D from the touch position P to the first infrared receiver 300 may be computed according to a formula D=H·cotα;

A coordinate determining unit for determining coordinates of the touch position P according to the computed distance D from the touch position P to the first infrared receiver 300 and the determined infrared ray path in which the touch occurs;

Exemplarily, the coordinate determining unit may further determine the coordinates of the touch position P according to the distance D from the touch position P to the first infrared receiver 300 computed by the second determining unit and the infrared ray path in which the touch occurs determined by the first determining unit.

Based on a same inventive concept, an embodiment of the disclosure further provides a touch detection method of the above infrared touch screen provided by the embodiment of the disclosure; since a principle of the method to solve the problem is similar to the foregoing infrared touch screen, and implementation of the method may refer to that of the infrared touch screen, which is not repeated herein.

Exemplarily, the touch detection method of the infrared touch screen provided by the embodiment of the disclosure comprises steps of:

S40: Controlling the infrared emitter to emit a plurality of infrared rays scattered and covering an light exiting surface of the display device;

S41: Receiving an infrared signal detected by the first infrared receiver and the plurality of second infrared receivers; and S42: Determining coordinates of a touch position according to the infrared signal detected by the first infrared receiver and the plurality of second infrared receivers.

Wherein S42 may include:

S401: Determining an infrared ray path in which a touch occurs according to a position of the second infrared receiver which does not detect out the infrared signal among the second infrared receivers;

S402: Computing a distance from the touch position to the first infrared receiver according to an included angle between the infrared signal received by the first infrared receiver and the display surface of the display device as well as a distance between the first infrared receiver and the infrared emitter; and S403: Determining coordinates of the touch position according to the computed distance from the touch position to the first infrared receiver and the determined infrared ray path in which the touch occurs.

The following will describe the touch detection method of the infrared touch screen provided by the embodiment of the disclosure in detail, with steps as follows:

1. Controlling the infrared emitter to emit a plurality of infrared rays scattered and covering a light exiting surface of the display device;

2. Receiving an infrared signal detected by the first infrared receiver and the second infrared receivers; exemplarily, as shown in FIG. 2, when no touch occurs, the second infrared receivers 400 will detect all infrared rays, emitted by the infrared emitter 200, scattered and covering the light exiting surface of the display device 100 and corresponding to the second infrared receivers 400 in a one-to-one correspondence relationship; at the moment, the signal receiving unit receives the infrared signals detected by the second infrared receivers 400; when a touch occurs, the infrared ray emitted by the infrared emitter 200 is blocked at the touch position, and therefore, there will be a second infrared receiver which does not detect out the infrared signal among the second infrared receivers 400, the blocked infrared ray is reflected, the first infrared receiver 300 detects the infrared ray reflected by the touch position; at the moment, the infrared signal detected by the first infrared receiver 300 is received by the signal receiving unit;

3. Determining an infrared ray path in which a touch occurs according to a position of a second infrared receiver which does not detect out the infrared signal among the second infrared receivers; exemplarily, as shown in FIG. 2, an infrared signal from the second infrared receiver, which does not detect out the infrared signal, among the second infrared receivers 400 is not received by the signal receiving unit, the first determining unit may determine the infrared ray path in which the touch occurs according to the position of the second infrared receiver;

4. Computing a distance from the touch position to the first infrared receiver according to an included angle between the infrared signal received by the first infrared receiver and the display surface of the display device as well as a distance between the first infrared receiver and the infrared emitter; exemplarily, as shown in FIG. 3, the second determining unit may detect the included angle between the infrared signal received by the first infrared receiver 300 and the display surface of the display device 100, while the distance H between the first infrared receiver 300 and the infrared emitter 200 is set according to actual situation, that is to say, H is a constant value, and the distance D from the touch position P to the first infrared receiver 300 may be computed according to a formula D=H·cotα;

5. Determining coordinates of the touch position according to the computed distance from the touch position to the first infrared receiver and the determined infrared ray path in which the touch occurs; exemplarily, as shown in FIG. 3, the coordinates of the touch position P are determined by the coordinate determining unit according to the distance D from the touch position P to the first infrared receiver 300 computed by the second determining unit and the infrared ray path in which the touch occurs determined by the first determining unit.

So far, the coordinates of the touch position of the infrared touch screen provided by the embodiment of the disclosure are determined through the above steps 1 to 5.

Based on the same inventive concept, an embodiment of the disclosure further provides a display apparatus, comprising the above infrared touch screen provided by the embodiment of the disclosure; the display device may be a cellphone, a tablet computer, a television, a display, a laptop, a digital photo frame, a navigator, or any other product or part with a display function. The display device still has other essential composite parts, which should be understood by those skilled in art, will not be repeated here, and should not be limitative of the disclosure. For implementation of the display device, the embodiments of the infrared touch screen can be referred to, and will not be repeated here.

In the infrared touch screen, the touch detection method thereof and the display apparatus provided by the embodiments of the disclosure, the infrared touch screen comprises a display device, and an infrared emitter and a first infrared receiver arranged on any side of the display device; wherein the infrared emitter emits a plurality of infrared rays scattered and covering an light exiting side of the display device, and the first infrared receiver detects an infrared ray reflected by a touch position among the infrared rays emitted by the infrared emitter; the infrared touch screen further comprises second infrared receivers arranged on other sides of the display device except the side provided with the infrared emitter and corresponding to the infrared rays in a one-toone correspondence relationship, a position of each of the second infrared receivers on the side is same as a position on a corresponding side where one of the plurality of infrared rays emitted by the infrared emitter irradiates; the infrared touch screen provided by the embodiment of the disclosure only adopts one infrared emitter, which can not only improve resolution to implement a precise touch operation, but also effectively reduce manufacturing cost, and is applicable to a large-sized display apparatus.

It is obvious that those skilled in the art can carry out various changes and improvements to the disclosure without departing from the spirit and scope of the disclosure. In this case, if such changes and improvements fall into the scope of the claims of the disclosure and equivalents thereof, the disclosure intends to contain these changes and improvements therein.

The application claims priority of Chinese Patent Application No. 201410736587.2 filed on Dec. 4, 2014, the disclosure of which is incorporated herein by reference in its entirety as part of the present application.

The invention claimed is:

1. An infrared touch screen, comprising:
   a display device;
   a single infrared emitter and a first infrared receiver, arranged on a first side of a display surface of the display device, the infrared emitter emitting a plurality of infrared rays scattered and covering a light exiting surface of the display device, the infrared emitter being positioned above and separated by an interval from the first infrared receiver, and the first side of the display surface not being provided with any other emitter or receivers; and
   a plurality of second infrared receivers, arranged at intervals on other sides of the display surface of the display device except the first side provided with the infrared emitter and the first infrared receiver, and corresponding to the plurality of infrared rays in a one-to-one correspondence relationship,
   wherein the first infrared receiver detects an infrared ray reflected by a touch position among the infrared rays emitted by the infrared emitter.

2. The infrared touch screen of claim 1, wherein a position of each of the plurality of second infrared receivers on the other sides is same as a position where one of the plurality of infrared rays emitted by the infrared emitter irradiates on a corresponding side.

3. The infrared touch screen of claim 1, wherein in a light exiting direction of the display device, the infrared emitter is positioned above the first infrared receiver, and there is a preset interval between the infrared emitter and the first infrared receiver.

4. The infrared touch screen of claim 3, wherein the infrared emitter and the first infrared receiver are both positioned at a center position of any side of the display device.

5. The infrared touch screen of claim 4, wherein the infrared emitter and the first infrared receiver are positioned on a bottom side of the display device.

6. The infrared touch screen of claim 1, wherein a plurality of infrared rays emitted by the infrared emitter are uniformly distributed on the display surface of the display device, and the second infrared receivers are uniformly distributed on the other sides of the display device except the first side provided with the infrared emitter.

7. The infrared touch screen of claim 1, further comprising: a signal processing chip, configured to determine coordinates of a touch position on the light exiting surface of the display device, and the signal processing chip is connected with the first infrared receiver and the plurality of second infrared receivers, respectively.

8. The infrared touch screen of claim 7, wherein the signal processing chip includes:
   a signal receiving unit, configured to receive an infrared signal detected by the first infrared receiver and the plurality of second infrared receivers;
   a first determining unit, configured to determine an infrared ray path in which a touch occurs according to a position of a second infrared receiver, which does not detect the infrared signal, among the second infrared receivers;
   a second determining unit, configured to compute a distance from the touch position to the first infrared receiver according to an included angle between the infrared signal received by the first infrared receiver and the display surface of the display device as well as a distance between the first infrared receiver and the infrared emitter; and
   a coordinate determining unit, configured to determine the coordinates of the touch position according to the computed distance from the touch position to the first infrared receiver and the determined infrared ray path in which the touch occurs.

9. A touch detection method of the infrared touch screen of claim 1, comprising:
   controlling the single infrared emitter to emit a plurality of infrared rays scattered and covering the light exiting surface of the display device;
   receiving an infrared signal detected by the first infrared receiver and the plurality of second infrared receivers; and
   determining coordinates of a touch position according to the infrared signal detected by the first infrared receiver and the plurality of second infrared receivers.

10. The touch detection method of claim 9, wherein the determining coordinates of a touch position according to the infrared signal detected by the first infrared receiver and the plurality of second infrared receivers includes:
    determining an infrared ray path in which a touch occurs according to a position of a second infrared receiver which does not detect the infrared signal, among the plurality of second infrared receivers;
    computing a distance from the touch position to the first infrared receiver according to an included angle between the infrared signal received by the first infrared receiver and the display surface of the display device as well as a distance between the first infrared receiver and the infrared emitter; and
    determining the coordinates of the touch position according to the computed distance from the touch position to the first infrared receiver and the determined infrared ray path in which the touch occurs.

11. A display device, comprising an infrared touch screen, wherein the infrared touch screen comprises:
    a display device;
    a single infrared emitter and a first infrared receiver, arranged on a first side of a display surface of the display device, the infrared emitter emitting a plurality of infrared rays scattered and covering a light exiting surface of the display device, the infrared emitter being positioned above and separated by an interval from the first infrared receiver, and the first side of the display surface not being provided with any other emitter or receivers; and a plurality of second infrared receivers, arranged at intervals on other sides of the display surface of the display device except the first side provided with the infrared emitter and the first infrared receiver, and corresponding to the plurality of infrared rays in a one-to-one correspondence relationship, wherein the first infrared receiver detects an infrared ray reflected by a touch position among the infrared rays emitted by the infrared emitter.

* * * * *